(12) United States Patent
Fujiwara et al.

(10) Patent No.: US 6,956,070 B2
(45) Date of Patent: Oct. 18, 2005

(54) WATER-SOLUBLE FILM AND PACKAGE USING THE SAME

(75) Inventors: Naoki Fujiwara, Kurashiki (JP); Shintaro Hikasa, Kurashiki (JP); Takanori Isozaki, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 302 days.

(21) Appl. No.: 10/122,306

(22) Filed: Apr. 16, 2002

(65) Prior Publication Data

US 2002/0182348 A1 Dec. 5, 2002

(30) Foreign Application Priority Data

Apr. 20, 2001 (JP) .......................................... 2001-123027
Sep. 28, 2001 (JP) .......................................... 2001-302360

(51) Int. Cl.$^7$ ................................................ C08L 3/02
(52) U.S. Cl. ............................. 524/47; 524/48; 524/50; 524/56; 524/58; 524/291; 525/59; 525/60; 525/61
(58) Field of Search .............................. 524/47, 48, 50, 524/56, 58, 291; 525/59, 60, 61

(56) References Cited

U.S. PATENT DOCUMENTS

| | | | |
|---|---|---|---|
| 3,223,687 A | | 12/1965 | Crowe |
| 3,402,098 A | * | 9/1968 | Baum et al. .............. 428/424.2 |
| 4,119,604 A | | 10/1978 | Wysong |
| 4,774,285 A | * | 9/1988 | Pfohl et al. .................... 525/60 |
| 5,102,950 A | | 4/1992 | Terada et al. |
| 5,326,809 A | * | 7/1994 | Bott et al. .................... 524/459 |
| 5,708,087 A | * | 1/1998 | Buck et al. .................. 525/136 |
| 5,753,759 A | * | 5/1998 | Hartmann et al. .......... 525/218 |
| 6,166,117 A | * | 12/2000 | Miyazaki .................... 524/291 |
| 6,737,013 B1 | * | 5/2004 | Kusudou et al. ............ 264/670 |

FOREIGN PATENT DOCUMENTS

| | | |
|---|---|---|
| EP | 0 354 410 | 2/1990 |
| EP | 0 490 562 | 6/1992 |
| JP | 53-24351 | 3/1978 |
| JP | 52-179550 | 8/1987 |
| JP | 63-168437 | 7/1988 |
| JP | 2-75650 | 3/1990 |
| JP | 2-124945 | 5/1990 |
| JP | 2-153960 | 6/1990 |
| JP | 3-124734 | 5/1991 |
| JP | 4-114014 | 4/1992 |
| JP | 4-151243 | 5/1992 |
| JP | 4-170405 | 6/1992 |
| JP | 5-17597 | 1/1993 |
| JP | 5-59113 | 3/1993 |
| JP | 5-294358 | 11/1993 |
| JP | 6-65463 | 3/1994 |
| JP | 7-118407 | 5/1995 |
| JP | 8-81568 | 3/1996 |
| JP | 8-188697 | 7/1996 |
| JP | 9-272774 | 10/1997 |
| JP | 9-272775 | 10/1997 |
| JP | 9-316270 | 12/1997 |
| JP | 10-36538 | 2/1998 |
| JP | 11-222546 | 8/1999 |
| JP | 11-236419 | 8/1999 |

OTHER PUBLICATIONS

Patent Abstracts of Japan, JP 06–184251, Jul. 5, 1994.

* cited by examiner

Primary Examiner—Bernard Lipman
(74) Attorney, Agent, or Firm—Oblon, Spivak, McClelland, Maier & Neustadt, P.C.

(57) ABSTRACT

The present invention provides a water-soluble film which comprises a modified polyvinyl alcohol containing an N-vinylamide monomer unit in an amount of 1 to 10 mole percent, and a carboxyl group and a lactone group in a total amount of 0.020 to 4.0 mole percent in the molecule, and having a degree of polymerization of 300 to 3000, and a degree of hydrolysis of 75 to 99.5 mole percent. Further, the present invention provides a package obtained by packaging an acidic substance, a chlorine-containing compound, or the like using the water-soluble film.

17 Claims, No Drawings

WATER-SOLUBLE FILM AND PACKAGE USING THE SAME

BACKGROUND OF THE INVENTION

1. Field of the Invention

The present invention relates to a water-soluble film and a package using the same. More particularly, the present invention relates to a water-soluble film made of a modified polyvinyl alcohol (hereinafter, polyvinyl alcohol may be abbreviated as "PVA"), of which the contents of an N-vinylamide monomer unit, and a carboxyl group and a lactone ring, and the degree of polymerization and the degree of hydrolysis are specified, and which is excellent simultaneously in cold water solubility, biodegradability, chemical resistance, and practical physical properties such as strength and stiffness, and a package using the same.

2. Description of the Prior Art

In recent years, as a method for using various chemicals including agrochemicals, laundry detergents, bleaching agents, toiletry products, industrial chemicals, and the like, there has become employed a method in which each of these chemicals is hermetically packaged on a unit dose basis by a water-soluble film (unit dose package), and it is thrown into water still in the packaged form for use, so that the contents are dissolved or dispersed together with the packaging film in water to be used. The unit dose package has advantages in that a hazardous chemical can be used without direct contact therewith during use, that no metering is necessary for use because a predetermined amount of the contents has already been packaged, that the disposal of the container packaging the contents is unnecessary, and the like.

In the art, PVA films have often been used as such water-soluble films for unit dose package. The PVA film generally has features of tough film, excellent transparency, and good printability. However, the PVA increases in crystallinity with an increase in its degree of hydrolysis. Accordingly, the proportion of the crystalline portion which will not dissolve in cold water increases. Therefore, not a PVA with a high degree of hydrolysis, referred to as a completely hydrolyzed type, but an unmodified partially hydrolyzed PVA has been employed for use as a cold water-soluble film for unit dose package, or the like.

The water-soluble film using an unmodified partially hydrolyzed PVA has features of being readily soluble in cold water and hot water, excellent mechanical strength, and the like. However, in recent years, from the viewpoints of workability, chemical resistance, environmental protection, and the like, there has been a demand for a water-soluble film which simultaneously satisfies a large number of performance requirements such as higher dissolving rate in water, low susceptibility to bag breakage due to an impact, low degree of change in solubility in water with time during storage of the film, and good biodegradability.

A conventional unmodified partially hydrolyzed PVA film has a sufficient cold water solubility at the early stage of production of the film. However, when it is stored for a long time, unfavorably, the cold water solubility decreases presumably because of the gradual growth of the crystals in the meantime. In addition, for the unmodified partially hydrolyzed PVA film, when an alkaline or acidic substance is packaged therein, hydrolysis of acetic acid groups remaining in the partially hydrolyzed PVA occurs during storage. Accordingly, crystallization proceeds, so that the film becomes insoluble. For this reason, the film does not satisfy the necessary performance requirements. Further, for a film using an unmodified partially hydrolyzed PVA, when a chlorine-containing compound such as an agrochemical or a bactericide is packaged therein, and allowed to stand for a long time, the film is colored or hardened. In addition, the film is reduced in water solubility with time to become water insoluble or slightly soluble. Therefore, the chemical agent will not dissolve or disperse in water while being packaged in the film. As a result, unfavorably, the initially intended object cannot be attained.

As the ones solving these problems, various water-soluble films made of a modified PVA have been proposed. As examples of the modified PVA, there are known a carboxyl group-modified PVA ("Application and Market of Water-Soluble Polymer" pp. 266–277, CMC, issued in 1984), a hydrolyzate of a copolymer of an allyl ester and a vinyl ester (Japanese Unexamined Patent Application (Kokai) 62-179550), a PVA containing at least one of an oxyalkylene group, a sulfonic group, and a cationic group (Japanese Unexamined Patent Application (Kokai) 63-168437), a PVA containing a 2-pyrrolidone ring (Japanese Unexamined Patent Application (Kokai) 2-124945, U.S. Pat. No. 5,102, 950 and EP0354410), a hydrolyzate of a copolymer of N-vinylacetamides and a vinyl ester (Japanese Unexamined Patent Application (Kokai) 5-59113), a hydrolyzate of a copolymer of a diacetone acrylamide and a vinyl ester (Japanese Unexamined Patent Application (Kokai) 5-17597), a hydrolyzate of a copolymer of an oxyalkylene group-containing vinyl ether and a vinyl ester (Japanese Unexamined Patent Application (Kokai) 11-236419), and the like.

Whereas, as the films for packaging chlorine-containing compounds such as a bactericide, polyethylene oxide-based films and cellulose-based films are known. However, they have a very slow rate of dissolution in water and lack in mechanical physical properties, and are hard and brittle, and hence, unfavorably, they have a very small impact resistance at a low temperature. As the ones solving such a problem, there are known water-soluble films obtained by mixing a PVA and a carboxylate-modified PVA with adjuvants such as polyethylene glycol and propyl gallate (Japanese Unexamined Patent Application (Kokai) 53-24351 and U.S. Pat. No. 4,119,604), a water-soluble film obtained by mixing a sulfonic acid-modified PVA with an adjuvant such as propyl gallate (Japanese Unexamined Patent Application (Kokai) 11-222546), a-water-soluble film for packaging an agrochemical obtained by mixing a sodium 2-acrylamide-2-methylsulfonate-modified PVA with a phenol derivative such as bisphenol A (Japanese Unexamined Patent Application (Kokai) 7-118407), a water-soluble thermoplastic film made of a copolymer of N-vinylacetamide and a vinyl comonomer (Japanese Unexamined Patent Application (Kokai) 5-294358), and the like.

However, the water-soluble film made of a carboxyl group-modified PVA has a deficiency in that the solubility in cold water is impaired upon contact with an acidic substance. Further, the carboxyl group-modified PVA may gel by heat. Still further, for the carboxyl group-modified PVA, by increasing the carboxyl group content thereof, it is possible to enhance the solubility in cold water, whereas the reduction in biodegradability of the modified PVA is incurred. The water-soluble film made of such a carboxyl group-modified PVA with a reduced biodegradability will be discharged into environment after being dissolved in water, and hence the use thereof is not preferable.

The film made of a hydrolyzate of a copolymer of an ally ester and a vinyl ester, a hydrolyzate of a copolymer of an oxyalkylene group-containing ally ether and a vinyl ester, a hydrolyzate of a copolymer of an oxyalkylene group-containing vinyl ether and a vinyl ester, or the like has the following problem. Namely, the copolymerizabilities of an ally ester, an oxyalkylene-containing allyl ether, and an oxyalkylene-containing vinyl ether with a vinyl ester are low. Accordingly, the amount of modification of the PVA is restricted to a low level, and hence the water solubility of the film is insufficient. When the amount of modification of the PVA is raised by increasing each amount of an ally ester, an oxyalkylene group-containing allyl ether, and an oxyalkylene-containing vinyl ether relative to the amount of a vinyl ester for copolymerization, the film produced from each resulting modified PVA is not only reduced in biodegradability but also reduced in degree of polymerization of the modified PVA. Therefore, the film produced from the modified PVA cannot be said to have enough strength and impact resistance to be used for packaging purpose, and thus, unpreferably, it will often undergo bag breakage during use.

As for the film made of a modified PVA in which an ionic group such as a sulfonic group or a cationic group has been introduced, and the film made of a hydrolyzate of a copolymer of a diacetone acrylamide and a vinyl ester, the biodegradabilities of the films tend to decrease with an increase in modification amount. In consequence, a water-soluble film simultaneously satisfying requirements in regard to water solubility, biodegradability, and practical physical properties such as strength cannot be obtained yet.

The film made of a 2-pyrrolidone ring-containing PVA, and the film made of a hydrolyzate of a copolymer of N-vinylacetamides and a vinyl ester have a problem of insufficient cold water solubility because a 2-pyrrolidone ring-containing monomer and N-vinylacetamides are non-ionic monomers. Attempts have been made to increase the modification amount, reduce the degree of hydrolysis, reduce the degree of polymerization, and perform other methods, in order to solve the problem associated with the cold water solubility. However, a water-soluble film simultaneously satisfying requirements in regard to water solubility, biodegradability, and practical physical properties such as strength cannot be obtained yet.

The films prepared by mixing a PVA and a modified PVA with adjuvants such as propyl gallate and bisphenol A could not be said to have sufficient performances due to the following fact. Namely, the films discolor in brown, and they are reduced in water solubility when a chlorine-containing substance is packaged therein, and stored for a long period. Whereas, the water-soluble film made of a copolymer of N-vinylacetamide and a vinyl comonomer has a slow rate of dissolution in water, and insufficient mechanical physical properties. For this reason, a water-soluble film simultaneously satisfying the requirements in regard to the water solubility, mechanical physical properties, and chlorine resistance cannot be obtained yet.

It is therefore an object of the present invention to provide a PVA-based water-soluble film which overcomes the foregoing deficiencies, has good cold water solubility and biodegradability, and is excellent in practical physical properties such as strength and stiffness, and will not be reduced in various physical properties with time even when it packages various chemicals such as acidic substances and chlorine-containing compounds.

SUMMARY OF THE INVENTION

In view of the foregoing circumstances, the present inventors made intensive investigations. As a result, they found that a modified PVA of which the content of an N-vinylamide monomer unit, the content of a carboxyl group and a lactone ring, and the degree of polymerization and the degree of hydrolysis respectively fall within given specific ranges is very useful for producing an objective water-soluble film. This finding has led to completion of the present invention.

Namely, the present invention provides a water-soluble film which comprises a modified polyvinyl alcohol containing an N-vinylamide monomer unit in an amount of 1 to 10 mole percent, and a carboxyl group and a lactone ring in a total amount of 0.020 to 4.0 mole percent in the molecule, and having a degree of polymerization of 300 to 3000, and a degree of hydrolysis of 75 to 99.5 mole percent.

The water-soluble film of the present invention is not only excellent in solubility in cold water but also excellent in chemical resistances such as acid resistance and chlorine resistance, biodegradability, and practical physical properties such as strength and stiffness, and hence it is very useful as a packaging material especially for chemicals or the like.

As described above, the film made of a PVA containing a 2-pyrrolidone ring, and the film made of a hydrolyzate of a copolymer of N-vinylacetamides and a vinyl ester known in the art have a problem of insufficient cold water solubility. However, even when such a PVA containing a 2-pyrrolidone ring, and a hydrolyzate of a copolymer of N-vinylacetamides and a vinyl ester are used as a constituent of films, by setting the content of a 2-pyrrolidone ring or the content of a N-vinylamide monomer unit, the total content of a carboxyl group and a lactone ring, and the degree of polymerization and the degree of hydrolysis within the aforesaid respective ranges, it is possible to provide a water-soluble film simultaneously satisfying the requirements in regard to water solubility, biodegradability, and practical physical properties such as strength.

DETAILED DESCRIPTION OF EMBODIMENTS OF THE INVENTION

It is essential that a modified PVA to be used in the present invention have an N-vinylamide monomer unit. As the N-vinylamide monomers, for example, mention may be made of the monomers represented by the following formula (I), N-vinyl-2-pyrrolidones and N-vinyl-2-caprolactam.

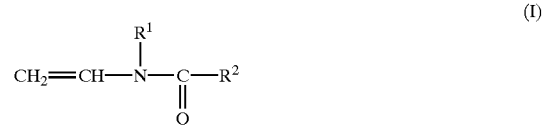

(where $R^1$ denotes a hydrogen atom or an alkyl group having 1 to 3 carbon atoms, and $R^2$ denotes a hydrogen atom or an alkyl group having 1 to 5 carbon atoms).

In the formula (I), as the alkyl groups each having 1 to 3 carbon atoms denoted by $R^1$, mention may be made of methyl, ethyl, propyl, and isopropyl groups, and the like. Whereas, as the alkyl groups each having 1 to 5 carbon atoms denoted by $R^2$, mention may be made of methyl, ethyl, propyl, isopropyl, butyl, isobutyl, t-butyl, pentyl, and isopentyl groups, and the like.

Specific examples of the monomer represented by the formula (I) may include N-vinylformamide, N-methyl-N-vinylformamide, N-vinylacetamide, and N-methyl-N-vinylacetamide.

Examples of N-vinyl-2-pyrrolidones may include N-vinyl-2-pyrrolidone, N-vinyl-3-propyl-2-pyrrolidone, N-vinyl-5,5-dimethyl-2-pyrrolidone, and N-vinyl-3,5-dimethyl-2-pyrrolidone.

Out of the N-vinylamide monomers, the monomers represented by the formula (I) and N-vinyl-2-caprolactam are preferred from the viewpoints of the acid resistance and the chlorine resistance. The preferred ones in terms of availability are N-vinylformamide, N-vinylacetamide, N-methyl-N-vinylacetamide, and N-vinyl-2-caprolactam. Further, the PVA-based water-soluble film tends to be affected by the degree of hydrolysis of the PVA. In general, the film tends to increase in hygroscopicity with a decrease in degree of hydrolysis. The carbon atom in the ring structure of N-vinyl-2-caprolactam shows hydrophobicity. Therefore, the PVA modified by N-vinyl-2-caprolactam has an excellent advantage in that the resulting film is less likely to absorb moisture even when the degree of hydrolysis is low as compared with the PVAs modified by other N-vinylamide monomers. Therefore, N-vinyl-2-caprolactam is in particular preferably used as the N-vinylamide monomer.

In the water-soluble film of the present invention, the content (amount of modification) of the N-vinylamide monomer unit contained in the modified PVA is essentially from 1 to 10 mole percent, and preferably from 2 to 8 mole percent. When the content of the N-vinylamide monomer unit is less than 1 mole percent, it cannot be said that the resulting film has a sufficient cold water solubility. On the other hand, when the content exceeds 10 mole percent, the modified PVA not only decreases in biodegradability but also increases in hygroscopicity. Accordingly, the resulting film has no stiffness, which presents a problem associated with the practical physical properties as the water-soluble film. It is noted that the cold water denotes 0° C. to 40° C. water in the present invention.

The water-soluble film may be required to have high strength and flexibility even when the thickness is as thin as 10 to 200 $\mu$m. For this reason, from the viewpoints of the strength and the toughness of the film, the degree of polymerization (viscosity-average polymerization degree) of the modified PVA to be used in the present invention is essentially from 300 to 3000, and preferably from 400 to 2500, and from the viewpoint of the water solubility of the film, in particular preferably from 500 to 2000. When the viscosity-average polymerization degree of the modified PVA is less than 300, the film tends to be reduced in strength. Whereas, when it is more than 3000, the solution viscosity or the melt viscosity of the film forming material may increase, resulting in a reduction in workability, or a reduction in solubility of the resulting film.

The viscosity-average polymerization degree of the modified PVA is measured according to the method described in JIS. Namely, it can be determined from the limiting viscosity [$\eta$] (dl/g) measured in 30° C. water after rehydrolyzing and purifying the modified PVA according to the following equation:

$$P=([\eta]\times1000/8.29)^{(1/0.62)}$$

In the present invention, the degree of hydrolysis of the modified PVA is essentially from 75 to 99.5 mole percent from the viewpoints of the strength, stiffness, and bag making property of the resulting film. If the degree of hydrolysis of the modified PVA is less than 75 mole percent, the resulting film has no stiffness, and is reduced in morphological stability, and when an alkaline substance or an acidic substance is packaged in the film, and stored, the film may be reduced in water solubility. On the other hand, a modified PVA having a degree of hydrolysis of more than 99.5 mole percent cannot be produced with stability on an industrial scale. Accordingly, it is not possible to perform film formation from such a modified PVA with stability.

The degree of hydrolysis of the modified PVA is, from the viewpoints of the chemical resistance and the morphological stability of the resulting film, from 75 to 99.5 mole percent, more preferably from 82 to 99.5 mole percent, still more preferably from 86 to 99.4 mole percent, in particular preferably from 90 to 99.2 mole percent, and most suitably from 92 to 99.0 mole percent. The degree of hydrolysis of the modified PVA is measured according to the method described in JIS.

In the present invention, the total content of a carboxyl group and a lactone ring of the modified PVA is essentially from 0.020 to 4.0 mole percent, preferably from 0.022 to 3.0 mole percent, more preferably from 0.024 to 2.5 mole percent, and in particular preferably from 0.025 to 2.0 mole percent. In the water-soluble film of the present invention, the carboxyl groups include alkali metal salts thereof, and as the alkali metals, mention may be made of potassium and sodium.

When the total content of a carboxyl group and a lactone ring is less than 0.020 mole percent, the resulting film is insufficient in terms of cold water solubility and morphological stability, so that it does not become a water-soluble film intended by the present invention. On the other hand, when the total content of the carboxyl group and the lactone ring exceeds 4.0 mole percent, the biodegradability of the modified PVA decreases.

As methods for producing a modified PVA having an N-vinylamide monomer unit, and a carboxyl group and a lactone ring, there may be mentioned: (1) a method in which a vinyl ester polymer obtained by copolymerizing a vinyl ester monomer such as vinyl acetate, an N-vinylamide monomer, and a monomer capable of forming a carboxyl group and a lactone ring is hydrolyzed in a solution such as alcohol or dimethyl sulfoxide; (2) a method in which a vinyl ester monomer and an N-vinylamide monomer are copolymerized in the presence of a thiol compound containing a carboxyl group such as mercaptoacetic acid and 3-mercaptopropionic acid, and then, the resulting vinyl ester polymer is hydrolyzed; (3) a method in which during copolymerization of a vinyl ester monomer such as vinyl acetate and an N-vinylamide monomer, the chain transfer reactions to an alkyl group of the vinyl ester monomer and the vinyl ester polymer are effected to obtain a highly branched vinyl ester polymer, followed by hydrolysis thereof; (4) a method in which a copolymer of a monomer having an epoxy group, a vinyl ester monomer, and an N-vinylamide monomer is allowed to react with a thiol compound having a carboxyl group, followed by hydrolysis; (5) a method in which an N-vinylamide monomer and a vinyl ester monomer are copolymerized, and then the acetalizing reaction of the resulting vinyl ester polymer and aldehydes having a carboxyl group is performed; and the like.

As the aforesaid vinyl ester monomers, mention may be made of vinyl formate, vinyl acetate, vinyl propionate, vinyl valerate, vinyl caprate, vinyl laurate, vinyl stearate, vinyl benzoate, vinyl pivalate, vinyl versatate, and the like. Out of these, vinyl acetate is preferred from the viewpoint of industrially obtaining the modified PVA.

As the aforesaid monomers capable of forming a carboxyl group and a lactone ring, mention may be made of monomers having carboxyl groups derived from fumaric acid, maleic acid, itaconic acid, maleic anhydride, itaconic anhydride, and the like; acrylic acid and salts thereof; acrylic esters such as methyl acrylate, ethyl acrylate, n-propyl acrylate, and i-propyl acrylate; methacrylic acid and salts thereof; methacrylic esters such as methyl methacrylate, ethyl methacrylate, n-propyl methacrylate, and i-propyl methacrylate; acrylamide and acrylamide derivatives such as N-methylacrylamide and N-ethylacrylamide; and methacrylamide and methacrylamide derivatives such as N-methylmethacrylamide and N-ethylmethacrylamide.

The content of the carboxyl group and the lactone ring of the modified PVA can be determined from the proton NMR peak.

In the present invention, the modified PVA may contain other monomer units than the vinyl alcohol unit, the vinyl ester monomer unit, the N-vinylamide monomer unit, and the monomer unit capable of forming a carboxyl group and a lactone ring unless the effects of the present invention are impaired. As such monomer units, mention may be made of monomer units: α-olefins such as ethylene, propylene, and 1-hexene; vinyl ethers such as methyl vinyl ether, ethyl vinyl ether, n-propyl vinyl ether, i-propyl vinyl ether, and n-butyl vinyl ether; vinyl ethers having a hydroxy group such as ethylene glycol vinyl ether, 1,3-propanediol vinyl ether, and 1,4-butanediol vinyl ether; allyl acetate; allyl ethers such as propyl allyl ether; monomers having an oxyalkylene group; vinyl silanes such as vinyl trimethoxysilane; isopropenyl acetate; α-olefins having a hydroxy group such as 3-buten-1-ol, 4-penten-1-ol, 5-hexen-1-ol, 7-octen-1-ol, and 3-methyl-3-buten-1-ol; monomers having a sulfonic group derived from ethylenesulfonic acid, allylsulfonic acid, methallylsulfonic acid, 2-acrylamide-2-methylpropanesulfonic acid, or the like; and monomer units obtained by copolymerizing monomers having a cationic group derived from vinyloxyethyl trimethylammonium chloride, vinyloxybutyl trimethylammonium chloride, vinyloxyethyl dimethylamine, vinyloxymethyl diethylamine, N-acrylamidemethyl trimethylammonium chloride, N-acrylamideethyl trimethylammonium chloride, N-acrylamidedimethylamine, allyltrimethylammonium chloride, methallyl trimethylammonium chloride, dimethylallylamine, allylethylamine, or the like. The content of each of these monomer units varies according to the intended purpose and use, but generally it is not more than 5 mole percent, and preferably not more than 2 mole percent.

The modified PVA to be used in the present invention may also be a terminal modified product obtained in the following manner. Namely, a vinyl ester monomer such as vinyl acetate and an N-vinylamide monomer are copolymerized in the presence of a thiol compound such as 2-mercaptoethanol or n-dodecanethiol except for the aforesaid thiol compound having a carboxyl group. The resulting vinyl ester polymer is hydrolyzed.

As methods for copolymerizing the aforesaid vinyl ester monomer, N-vinylamide monomer, and monomer capable of forming a carboxyl group and a lactone ring, mention may be made of known methods such as bulk polymerization method, solution polymerization method, suspension polymerization method, and emulsion polymerization method. Out of these, the bulk polymerization method whereby polymerization is performed without the use of solvent or the solution polymerization method whereby polymerization is performed in a solvent such as alcohol is generally employed. As alcohols to be used as solvents for solution polymerization, mention may be made of lower alcohols such as methanol, ethanol, and propanol. As initiators to be used for copolymerization, mention may be made of known initiators including azo-based initiators such as 2,2'-azobis (isobutyronitrile), 2,2'-azobis(2,4-dimethylvaleronitrile), or peroxide-based initiators such as benzoyl peroxide and n-propyl peroxycarbonate. Although the polymerization temperature has no particular restriction, it is suitably within a range of from 0° C. to 150° C.

In the present invention, the modified PVA can be obtained in the following manner. Namely, a vinyl ester polymer obtained by copolymerizing the vinyl ester monomer, N-vinylamide monomer, and monomer capable of forming a carboxyl group and a lactone ring is hydrolyzed by using an alkali catalyst such as potassium hydroxide or sodium hydroxide, or an acid catalyst such as sulfuric acid, hydrochloric acid or p-toluenesulfonic acid generally in one or at least two solvents selected from alcohols such as methanol, esters such as methyl acetate, and dimethyl sulfoxide, preferably in a lower alcohol solvent such as methanol. The conditions for the hydrolysis reaction are appropriately adjusted according to the structure of the vinyl ester polymer and the degree of hydrolysis of the objective vinyl alcohol polymer. However, in general, the reaction is carried out in a catalyst/vinyl ester monomer unit molar ratio of from 0.001 to 5.0, at a reaction temperature of from 20 to 180° C., for a reaction time in the range of from 0.1 to 20 hours. As the hydrolysis method, known methods such as a batch method and a continuous method are applicable.

As for the water-soluble film of the present invention, when it contains a specific amount of an alkali metal, the film is excellent particularly in cold water solubility and film forming property. The content of the alkali metal per 100 parts by weight of the modified PVA is preferably from 0.05 to 2 parts by weight, more preferably from 0.08 to 1.5 parts by weight, and in particular preferably from 0.1 to 1.0 part by weight in terms of sodium. As the alkali metals, mention may be made of potassium and sodium, which can be present mainly as salts of lower fatty acids such as acetic acid and propionic acid, or salts of acid groups such as the carboxyl group and the sulfonic group contained in the monomer unit of the modified PVA. Further, the alkali metal may be properly present in an additive for the water-soluble film, described below.

When the content of the alkali metal is less than 0.05 part by weight, the effects of improving the cold water solubility and the film forming property may not be produced. Particularly when the film is produced by a melt film formation method, a high degree of gelation occurs during melting of the modified PVA. Accordingly, the film forming property is reduced, and hence the productivity is reduced. On the other hand, when the content of the alkali metal is more than 2 parts by weight, unpreferably, the film tends to be colored presumably due to the fact that the modified PVA has a carboxyl group.

In the present invention, the method for allowing a specific amount of alkali metal to be contained in the water-soluble film has no particular restriction. Mention may be made of a method in which an alkali metal-containing compound typified by an alkali metal salt of a lower fatty acid such as acetic acid or propionic acid is added during preparation of a modified PVA solution; a method in which the same alkali metal-containing compound is added during fabrication of a pellet made of a modified PVA; and the like.

The content of the alkali metal can be determined by an atomic absorption method.

To the water-soluble film of the present invention, if required, a saccharide may be mixed. As saccharides, mention may be made of monosaccharides such as glucose, oligosaccharides, polysaccharides, and linear sugar alcohols such as mannite. As the polysachharides, mention may be made of starch, cellulose, chitin, chitosan, hemicellulose, pectin, pullulan, agar, alginic acid, carageenan, dextrin, trehalose, and the like. One or at least two of these may be used. As linear sugar alcohols, mention may be made of tetrits having 4 carbon atoms such as threit and erythrit, pentits having 5 carbon atoms such as arabit and xylit, and hexits having 6 carbon atoms such as glycit, mannite, and sorbit. By adding a saccharide thereto, it is possible to further enhance the water solubility and the biodegradability of the film, to enhance the borate ion resistance, or to reduce the decrease in cold water solubility after packaging of, particularly, PVA-degrading chemicals (chlorine-based substances, etc.). In particular, starch is preferably mixed therein out of the saccharides because of the good cold water solubility of the film upon addition of the saccharide. Examples of starch usable include raw starches from corn, potato, and the like, and processed starches obtained by subjecting them to a physical or chemical treatment (dextrin, oxidized starch, etherified starch, cationized starch, and the like).

The amount of the saccharide to be mixed is preferably from 1 to 100 parts by weight, more preferably from 2 to 90 parts by weight, and in particular preferably from 3 to 80 parts by weight, per 100 parts by weight of the modified PVA. In general, the compatibility between a PVA and a saccharide is bad. Therefore, when a saccharide is mixed in the PVA in large amounts, the resulting film is largely reduced in mechanical physical properties such as film strength. However, the modified PVA to be used in the water-soluble film of the present invention has a feature of excellent compatibility with saccharides, particularly with starch. For this reason, it is possible to mix a saccharide in large amounts in the water-soluble film of the present invention. If the amount of the saccharide to be mixed is less than 1 part by weight, the effect of improving the water solubility and the biodegradability of the film may not be produced. On the other hand, if the amount of the saccharide to be mixed is more than 100 parts by weight, the low temperature impact resistance of the film is reduced. As a result, bag breakage becomes more likely to occur.

To the water-soluble film of the present invention, if required, a gallic acid or an alkyl ester thereof having 1 to 5 carbon atoms, and a hydroxycarboxylic acid having a reducing property or a salt thereof may be further mixed.

The gallic acid or an alkyl ester thereof having 1 to 5 carbon atoms has a function of inhibiting the film after packaging of a chlorine-containing compound from becoming water insoluble. Specific examples of the gallic acid and alkyl esters thereof having 1 to 5 carbon atoms include gallic acid and salts thereof, methyl gallate, ethyl gallate, propyl gallate, and isoamyl gallate. Out of these, gallic acid and propyl gallate are more preferred in terms of chlorine resistance. The amount of gallic acid or an alkyl ester thereof having 1 to 5 carbon atoms to be mixed is preferably from 0.05 to 20 parts by weight, more preferably from 0.1 to 10 parts by weight, and in particular preferably from 0.2 to 3 parts by weight, per 100 parts by weight of the modified PVA. When the amount of gallic acid or an alkyl ester thereof having 1 to 5 carbon atoms to be mixed exceeds 20 parts by weight, unpreferably, the strength of the film may be reduced, or the gallic acid or the alkyl ester thereof having 1 to 5 carbon atoms may precipitate on the surface of the film.

The reducing hydroxycarboxylic acid or a salt thereof has a function of improving the water solubility of the film. Further, it has a function of preventing the coloration of the film caused by the action of the gallic acid or the alkyl ester thereof having 1 to 5 carbon atoms and a polyvalent metal ion such as iron ion contained in the piping in the production step of the film. Specific examples of usable hydroxycarboxylic acid or a salt thereof may include citric acid, tartaric acid, L-ascorbic acid, and malic acid, and salts thereof. Out of these, citric acid, tartaric acid, and L-ascorbic acid are preferred, and citric acid and tartaric acid are particularly preferred in terms of water solubility.

The amount of hydroxycarboxylic acid or a salt thereof to be mixed is preferably from 0.01 to 10 parts by weight, more preferably from 0.05 to 5 parts by weight, and in particular preferably from 0.1 to 3 parts by weight, per 100 parts by weight of the modified PVA. When the amount of hydroxycarboxylic acid or a salt thereof exceeds 10 parts by weight, unpreferably, the strength of the film may be reduced, or the hydroxycarboxylic acid or the salt thereof may precipitate on the surface of the film.

In general, the water-soluble film is required to have such strength and toughness as to be capable of withstanding use in high-temperature and high-humidity districts or cold districts. Particularly, it is required to have an impact resistance at a low temperature. To the water-soluble film of the present invention, various plasticizers may be mixed in order to lower the glass transition point of the film for the purpose of improving the impact resistance at a low temperature. Further, to the water-soluble film of the present invention, plasticizers may be mixed for the purpose of improving the solubility in water in addition to the foregoing purpose.

The plasticizer to be mixed in the water-soluble film of the present invention has no particular restriction so long as it is commonly used as a plasticizer for a PVA. Examples thereof include polyhydric alcohols such as glycerin, diglycerin, diethylene glycol, triethylene glycol, propylene glycol, dipropylene glycol, trimethylolpropane, pentaerythritol, and 1,3-butanediol; polyethers such as polyethylene glycol and polypropylene glycol; polyvinylamides such as polyvinyl pyrrolidone; phenol derivatives such as bisphenol A and bisphenol S; amide compounds such as N-methylpyrrolidone and dimethylacetamide; compounds obtained by adding ethylene oxide to polyhydric alcohol such as glycerin, pentaerythritol, and sorbitol; and water. These may be used singly or in combination of at least two. Out of these plasticizers, for the purpose of improving the water solubility, glycerin, diglycerin, diethylene glycol, triethylene glycol, propylene glycol, dipropylene glycol, trimethylol propane, polyethylene glycol, and polyvinyl pyrrolidone are preferably used. Particularly, from the viewpoint of inhibiting the reduction in water solubility of the film due to the bleedout of the plasticizer, glycerin, diglycerin, trimethylolpropane, polyethylene glycol, and polyvinyl pyrrolidone are in particular preferably used.

The molecular weight of polyethylene glycol when polyethylene glycol is used as a plasticizer has no particular restriction. However, the number-average molecular weight is preferably from 100 to 1000 in terms of the compatibility with the modified PVA and the effect of inhibiting the reduction in water solubility due to the bleedout. The molecular weight of polyvinyl pyrrolidone also has no particular restriction. However, the weight-average molecular weight is preferably from 1000 to 20000 in terms of the compatibility with the PVA.

The amount of the plasticizer to be mixed is preferably from 1 to 50 parts by weight per 100 parts by weight of the modified PVA. When the amount of the plasticizer to be added is less than 1 part by weight, the effect resulting from the addition of the plasticizer may not be produced. On the other hand, when the amount of the plasticizer to be added exceeds 50 parts by weight, bleedout of the plasticizer occurs to a larger extent, so that the resulting film may be reduced in antiblock properties. From the viewpoint of the rate of dissolution of the resulting film in water, the plasticizer is preferably used in an amount of at least 20 parts by weight per 100 parts by weight of the modified PVA. On the other hand, from the viewpoint of the stiffness (process passability on a bag making machine, etc.) of the resulting film, the plasticizer is preferably mixed in an amount of not more than 40 parts by weight per 100 parts by weight of the modified PVA. From the viewpoint of improving the water solubility of the resulting film, a larger amount of the plasticizer to be mixed is preferred. Further, the heat sealing temperature decreases with an increase in the amount of the plasticizer mixed, so that the productivity during film bag making tends to be improved. In particular, the plasticizer is preferably mixed in such a proportion that the heat sealing temperature of the resulting film is not more than 170° C., and the plasticizer is more preferably mixed in such a proportion as to ensure not more than 160° C.

The amount of the plasticizer mixed is likely to affect the strength and the Young's modulus of the resulting film. However, from the viewpoint of the practical utility of the resulting film, the strength of the film is preferably at least 1.0 kg/cm$^2$, and more preferably at least 1.5 kg/cm$^2$. From the viewpoint of the process passability on a bag making machine or the like of the resulting film, the Young's modulus of the film is preferably at least 1.5 kg/cm$^2$, more preferably at least 2.0 kg/cm$^2$, and in particular preferably at least 2.5 kg/cm$^2$. The plasticizer is preferably mixed so as to obtain a film having a Young's modulus within such a range.

To the water-soluble film of the present invention, if required, an inorganic filler may further be mixed. Examples of the inorganic filler to be used in the water-soluble film of the present invention may include clays and talcs such as silica, heavy, light, or surface-treated calcium carbonate, aluminum hydroxide, aluminum oxide, titanium oxide, diatomaceous earth, barium sulfate, calcium sulfate, zeolite, zinc oxide, silicic acid, silicate salts, mica, magnesium carbonate, kaolin, halloysite, pyrophyllite, and sericite. These may be used singly or in combination of at least two thereof. Out of these, talc is preferably used particularly from the viewpoint of the dispersibility in the modified PVA. The mean particle size of the inorganic filler is preferably at least 1 $\mu$m from the viewpoint of the antiblock properties of the film, whereas it is preferably not more than 10 $\mu$m from the viewpoint of the dispersibility in the modified PVA. For satisfying both of the required characteristics of the antiblock properties of the film produced due to mixing of the inorganic filler and the dispersiblity of the inorganic filler in the modified PVA, it is more preferable that an inorganic filler with a mean particle size of about 1 to 7 $\mu$m is used.

The amount of the inorganic filler to be mixed is preferably from 0.5 to 20 parts by weight, more preferably from 0.7 to 15 parts by weight, and in particular preferably from 1 to 10 parts by weight per 100 parts by weight of the modified PVA from the viewpoint of the antiblock properties of the film and the dispersibility of the inorganic filler in the modified PVA. Incidentally, if the inorganic filler is mixed in an amount of more than 20 parts by weight, the dispersibility in the modified PVA decreases, and hence the inorganic filler aggregates. In consequence, the resulting film tends to be reduced in water solubility.

To the water-soluble film of the present invention, if required, additives such as colorants, perfumes, extenders, antifoaming agents, release agents, ultraviolet absorbers, and surfactants may be further mixed appropriately with no problem. Particularly, for improving the releasability between the metal surface of a die or drum of a film-producing machine and the films formed or a film-forming solution, a surfactant is preferably mixed in an amount of from 0.01 to 5 parts by weight per 100 parts by weight of the modified PVA. Further, to the water-soluble film of the present invention, if required, a PVA of a different type from the modified PVA used in the present invention, a water-soluble polymer such as carboxymethylcellulose, polyacrylamide, polyacrylic acid or a salt thereof, methylcellulose, or hydroxymethylcellulose may be mixed unless the effects of the present invention are impaired. Particularly, from the viewpoint of improving the water solubility of the film, a low viscosity type of carboxymethylcellulose is preferably added.

In producing the water-soluble film of the present invention, the raw material for production can be prepared in the following manner. Namely, to the modified PVA, if required, a plasticizer, a saccharide, an inorganic filler, and other components are mixed. These are blended by a known method such as a method in which the mixture is dissolved or dispersed in a solvent in a stirring vessel, or a method in which the mixture is melt-kneaded in an extruder.

The water-soluble film of the present invention can be produced by a film forming method commonly used for film formation, such as film casting, wet process film formation, dry process film formation, film extrusion, melting film formation, coating process, or inflation film formation method. For example, the components required for forming the water-soluble film of the present invention are dissolved in a mixed solution of one or at least two of the solvents as exemplified in water, dimethylsulfoxide, dimethylformamide, dimethylacetamide, methanol, n-propanol, i-propanol, phenol, and the like to prepare a homogeneous film-forming solution. Then, a film can be formed by a film forming method such as a film casting method. The concentration of the film-forming solution is preferably not more than 50% by weight (the solvent content being at least 50% by weight) from the viewpoint of the viscosity, and more preferably not more than 30% by weight (the solvent content being at least 70% by weight) from the viewpoint of the ease of formation of a matte state in the surface of the film produced.

The thickness of the water-soluble film of the present invention is preferably from 10 to 200 $\mu$m, from the viewpoint of the balance between the strength and the water solubility of the film, more preferably from 20 to 150 $\mu$m, and in particular preferably from 30 to 120 $\mu$m.

For improving the antiblock properties of the water-soluble film of the present invention, if required, it is possible to roll-matte the surface of the water-soluble film, to spread antiblocking powder of silica, starch, or the like to the water-soluble film, or to perform embossing. The film surface can be roll-matted by forming minute irregularities on the roll to be in contact with a film before drying during film formation. The embossing can be effected generally by nipping the film after formation between an embossing roll and a rubber roll under application of heat and pressure. Powder spreading is highly effective in preventing blocking, but may not be employed according to the use of the film. Therefore, blocking is preferably prevented by roll-matting or embossing. Roll-matting is particularly preferred in terms of how effectively blocking is prevented.

The water-soluble film of the present invention is excellent in rate of dissolution in cold water. The time required for complete dissolution in 10° C. water (film thickness 50 $\mu$m) is preferably not more than 200 seconds, more preferably not more than 150 seconds, and in particular preferably not more than 100 seconds. The time required for complete dissolution in 10° C. water, so referred to in this specification is the value obtained in the following manner. Namely, a 50 µm-thick film is cut into a 40 mm×40 mm square piece, which is then fixed on a slide mount, and immersed in the water stirred at 10° C. The time required for the film to completely dissolve is measured. When a film having a thickness different from 50 µm is used, it is the value converted based on the case where the film thickness is 50 µm according to the following equation (1):

$$\text{Dissolution time (second)} = (50/\text{film thickness } (\mu m))^2 \times \text{Dissolution time (second)} \quad (1)$$

The modified PVA to be used in the present invention is excellent in biodegradability. It shows a biodegradability of at least 60%, more preferably at least 65%, still more preferably at least 70%, and in particular preferably at least 75%. This indicates that the water-soluble film of the present invention is more excellent in biodegradability as compared with a conventional water-soluble film using an unmodified partially hydrolyzed PVA or an ion modified PVA. The biodegradability of the modified PVA is determined by using activated sludge with the method according to ISO 14851.

By using the water-soluble film of the present invention, the contents such as an acidic substance or a chlorine-containing compound is packaged therein. In consequence, it is possible to obtain a package.

The form of the acidic substance is liquid, solid, powder, granular, or other form, and has no particular restriction. The water-soluble film of the present invention is also preferably used for packaging an acidic substance in liquid form, which has been difficult to package by a water-soluble film in the art. When the acidic substance is liquid form, the film is required to have a high morphological stability for packaging. Further, when an acidic substance in solid form is packaged therein, the only problem is the reduction in physical properties of the film surface to be contact with the acidic substance. Whereas, when the acidic substance is liquid form, the acidic substance penetrates throughout the inside of the film, unfavorably, resulting in a significant reduction in physical properties. The water-soluble film of the present invention has excellent morphological stability and acid resistance, and hence it can package even an acidic substance in liquid form.

The water-soluble film of the present invention is applicable to any acidic substances so long as the acidic substances have a pH of not more than 6 when made into a 1% by weight of aqueous solution or aqueous dispersion. Examples of the acidic substance include agrochemicals, deodorants, and detergents.

The chlorine-containing compound is a substance containing chlorine in the molecule. Examples thereof include agrochemicals, bactericides, and bleaching agents. Specific examples of the chlorine-containing compound include isocyanuric acid trichloride, isocyanuric acid dichloride, the sodium salt of isocyanuric acid dichloride, N,N-dichlorohydantoin, and N-chloro-N-bromo-5,5-dimethylhydantoin. Examples of the agrochemicals include chloropicrin, 1,3-dichloropropene, and dichloroisopropyl ether. The chlorine-containing compound is in granular, tablet, powder or other form, or it may also be in liquid form. The chlroine-containing compound may contain a carrier such as talc, kaolin, bentonite, or diatomaceous earth, and extender, and in addition, a surfactant and a dispersant to improve the affinity for water and to achieve uniform dispersion.

The package produced from the water-soluble film of the present invention rapidly dissolves only by being thrown into water as it is, and the contents is rapidly released in water.

EXAMPLES

The following examples illustrate the present invention specifically, but not limit the scope of the present invention.

Incidentally, in the examples, "part(s)" and "%" mean "part(s) by weight" and "% by weight", respectively, unless otherwise specified. It is noted that the measurements and analyses of various characteristics of films were carried out in the following manner.

[Method for Measuring the Water Solubility of a Film]

A 10° C. constant temperature bath was equipped with a magnetic stirrer. A one-liter glass beaker containing 1 liter of distilled water was placed in the constant temperature bath, and the beaker contents were stirred at 250 rpm using a 5-cm rotor. After the temperature of the distilled water in the beaker reached 10° C., the water solubility measurement was started.

A film was cut into a 40 mm×40 mm square piece, which was then fixed on a slide mount, and immersed in the water stirred at 10° C., and the state of dissolution of the film was observed. The time (in second) required for the film to completely dissolve was measured. When a film having a thickness different from 50 µm is used, the measured value is converted to the value based on the film thickness of 50 µm according to the following equation (1):

$$\text{Dissolution time (second)} = (50/\text{film thickness } (\mu m))^2 \times \text{Dissolution time (second)} \quad (1)$$

[Method for Measuring the Young's Modulus and Strength]

Film specimens having a width of 10 mm were conditioned under a 20° C. and 65%RH atmosphere for 1 week, and then subjected to tensile testing using an autograph. The chuck distance was 50 mm, and the rate of pulling was 500 mm/min.

[Method for Evaluating the Chemical Resistance]

A 10 cm×15 cm bag was made from the film. Then, 40 g of a mixture of bordeaux mixture and diatomaceous earth (weight ratio 1:3) was charged in the inside thereof as a chemical, and hermetically enclosed therein by heat sealing at 140° C. The packaging bag was further wrapped in a film obtained by laminating polyethylene on aluminum, and the film was heat sealed. In consequence, the chemical was doubly hermetically packaged, so that water and plasticizers were prevented from scattering out of the packaging bag hermetically packaging the chemical. As an accelerated long-term storability test, this bag was placed in a 40° C. thermostat, and allowed to stand. After four weeks, it was taken out, and the water solubility of the packaged film was measured with the aforesaid measurement method to check the change with time from before packaging of the chemical.

[Method for Evaluating the Acid Resistance]

The test was carried out in the same manner as the foregoing method for evaluating the chemical resistance, except that 35 g of a fine powder of succinic acid (pH of 1% by weight of the aqueous solution: 2.4) was used as a chemical.

[Method for Evaluating the Chlorine Resistance]

A 10 cm×10 cm bag was made from the film, and conditioned under the conditions of 20° C. and 65%RH for 1 week. Then, 35 g of a tablet of pool bactericide containing trichloroisocyanuric acid as a main component was charged in the inside thereof as a chemical, and hermetically enclosed therein by heat sealing. The packaging bag was further wrapped in a film obtained by laminating polyethylene on aluminum, and the film was heat sealed. In consequence, the chemical was doubly hermetically packaged, so that water and plasticizers were prevented from scattering out of the packaging bag hermetically enclosing the chemical. As an accelerated long-term storability test, this bag was placed in a 40° C. thermostat, and allowed to stand. After four weeks, it was taken out, and the colorability, flexibility, and water solubility of the packaged film were evaluated by the following methods to check the change with time from before packaging of the chemical.

[Method for Evaluating the Coloration of the Film]

The coloration of the film after packaging of a chlorine-containing compound was evaluated based on the following criteria:
○: No coloration
Δ: slightly yellowed
×: discolored in brown

[Method for Evaluating the Flexibility of the Film]

The flexibility of the film after packaging of a chlorine-containing compound was evaluated by the texture based on the following criteria:
○: Flexible
Δ: slightly hardened
×: hardened Synthetic Example 1 (Synthesis of Modified PVA)

A 5-L reactor equipped with a stirrer, a reflux condenser, a nitrogen inlet tube, and a thermometer was charged with 2040 g of a vinyl acetate monomer, 905 g of methanol, 110.7 g of a 50% methanol solution of N-vinyl-2-caprolactam, and 4.3 g of a 10% methanol solution of an itaconic acid. The resulting solution was degassed by bubbling a nitrogen gas therethrough for 30 minutes. The increase of the temperature of the reactor was started. The polymerization was started by adding 1.5 g of 2,2'-azobis(isobutyronitrile) therein when the inside temperature reached 60° C. Polymerization was carried out while successively adding the 50% methanol solution of N-vinyl-2-caprolactam, and the 10% methanol solution of an itaconic acid so as to achieve a constant molar ratio relative to the vinyl acetate monomer. After 5 hours, the polymerization was stopped by cooling. The solid content at this step was 34%.

Then, the unreacted vinyl acetate monomer was removed at 30° C. under reduced pressure while occasionally adding methanol. A methanol solution of polyvinyl acetate copolymer (concentration 33%) was thus obtained. Then, to a methanol solution of polyvinyl acetate copolymer whose concentration had been adjusted to 25% by addition of methanol, a methanol solution of NaOH (10% concentration) with an alkali molar ratio (number of moles of NaOH/number of moles of vinyl acetate monomer unit) of 0.03 was added for hydrolysis. The degree of hydrolysis of the resulting modified PVA (PVA-1) was 98.4 mole percent.

To 1 g of the resulting modified PVA, 10 g of methanol was added. The temperature was increased to 60° C. to swell the modified PVA. Subsequently, 5 g of a methanol solution of NaOH (10% concentration) was added thereto with stirring at 60° C. for 3 hours. The resulting solution was subjected to Soxhlet extraction with methanol for 3 days, then dried to obtain a purified product of the modified PVA. The amount of N-vinyl-2-caprolactam monomer unit and the total content of the carboxyl group and the lactone ring unit determined from the proton NMR measurement of the modified PVA were 4.0 mole percent and 1.0 mole percent, respectively. Further, the mean degree of polymerization of the PVA was measured according to the conventional method of JIS K6726, and found to be 1500.

Each of modified PVAs (PVAs-2 to 10, and 12 to 27) was synthesized in the same manner as with the PVA-1, except that the polymerization conditions were changed so that the type and amount of the comonomer, the total amount of the carboxyl group and the lactone ring, the degree of polymerization, and the degree of hydrolysis were as shown in Table 1 below. The contents of the modified PVAs thus synthesized are shown in Table 1.

Synthetic Example 2 (Synthesis of PVA)

A 5-L reactor equipped with a stirrer, a reflux condenser, a nitrogen inlet tube, and a thermometer was charged with 2100 g of a vinyl acetate monomer and 900 g of methanol. The resulting solution was degassed by bubbling a nitrogen gas therethrough for 30 minutes. The increase of the temperature of the reactor was started. The polymerization was started by adding 0.4 g of 2,2'-azobis (isobutyronitrile) therein when the inside temperature reached 60° C. After 5 hours, the polymerization was stopped by cooling. The solid content at this step was 27%. Then, the unreacted vinyl acetate monomer was removed at 30° C. under reduced pressure while occasionally adding methanol. A methanol solution of polyvinyl acetate (concentration 33%) was thus obtained. Then, to a methanol solution of polyvinyl acetate copolymer whose concentration had been adjusted to 25% by addition of methanol, a methanol solution of NaOH (10% concentration) with an alkali molar ratio (number of moles of NaOH/number of moles of vinyl acetate monomer unit) of 0.005 was added for hydrolysis. The degree of hydrolysis of the resulting modified PVA (PVA-11) was 88.0 mole percent.

To 1 g of the resulting PVA, 10 g of methanol was added. The temperature was increased to 60° C. to swell the PVA. Subsequently, 5 g of a methanol solution of NaOH (10% concentration) was added thereto with stirring at 60° C. for 3 hours. The resulting solution was subjected to Soxhlet extraction with methanol for 3 days, and then dried to obtain a purified product of the PVA. The mean degree of polymerization of the PVA was measured according to the conventional method of JIS K6726, and found to be 1500.

Example 1

To every 100 parts by weight of the modified PVA (PVA-1) shown in Table 1, were added 15 parts by weight of glycerin as a plasticizer, 10 parts by weight of ethenfled starch, 5 parts by weight of talc with a mean particle size of 3 μm, sodium acetate in such an amount as to give 0.8 part by weight of sodium as an alkali metal, and water to form a 5% homogeneous aqueous solution (water content 95%). The resulting solution was cast onto a polyester film, and dried at room temperature. Then, the resulting film was released from the polyester film to obtain a 50 μm-thick film. The film thus obtained was subjected to a heat treatment at 100° C. for 10 minutes. The film was measured for its water solubility. As a result, the complete dissolution time in 10° C. water was 61 seconds. As the criteria for operability such as process passability typified by the stiffness of the film, the film was conditioned to 20° C. and 65%RH, and measured for its Young's modulus and strength. As a result, the Young's modulus and strength were found to be 3.6 kg /mm$^2$ and 3.0 kg/cm$^2$, respectively. Further, the modified PVA (PVA-1) was evaluated for its biodegradability by the method according to ISO 14851. The biodegradability was found to be 83%.

Subsequently, the chemical resistance was evaluated. As a result, the time required for the film after packaging of the chemical to completely dissolve in 10° C. water was 62 seconds, and the reduction in water solubility was not observed.

Examples 2 to 10

Each film was produced in the same manner as in Example 1, except that the contents of the modified PVA, and types and amounts of the alkali metal, plasticizer, saccharide, and inorganic filler were changed as shown in Tables 1 and 2, and various evaluations thereof were carried out. The evaluation results are shown in Table 3.

Examples 11 and 12

Evaluations were carried out in the same manner as in Example 1, except that the contents of each modified PVA, and types and amounts of each saccharide, and inorganic filler were changed as shown in Tables 1 and 2, and a succinic acid fine powder was used as a chemical to evaluate each acid resistance. The evaluation results are shown in Table 3.

Examples 13 to 15

Evaluations were carried out in the same manner as in Example 1, except that the contents of each modified PVA, and types and amounts of each additive and inorganic filler were changed as shown in Tables 1 and 2, and a pool bactericide containing trichloroisocyanuric acid as a main component was used as a chemical to evaluate each chlorine resistance. The evaluation results are shown in Table 4.

Comparative Examples 1 to 7

Each film was produced in the same manner as in Example 1, except that the contents of the modified PVA, and the amount of the alkali metal were changed as shown in Tables 1 and 2, and various evaluations thereof were carried out. The evaluation results are shown in Table 3.

The film made of an unmodified PVA with a degree of hydrolysis of 88 mole percent is inferior in chemical resistance (Comparative Example 1). As for the film based on a modified PVA having only a carboxyl group and a lactone ring, when the degree of hydrolysis of the modified PVA is as high as 98.1 mole percent, the water solubility is inferior (Comparative Example 2), whereas, when the degree of hydrolysis of the modified PVA is as low as 88.2 mole percent, the acid resistance becomes an issue (Comparative Example 3). Whereas, when the total amount of the carboxyl group and the lactone ring of the modified PVA is more than 4.0 mole percent, the biodegradability of the modified PVA is reduced (Comparative Example 4).

The film based on a modified PVA having a sulfonic group, and not having a carboxyl group and a lactone ring is apparently inferior in biodegradability as compared with the films of Examples (Comparative Example 5). The films each made of a modified PVA using only polyoxyethylene monoallyl ether as a comonomer are insufficient in terms of water solubility (Comparative Examples 6 and 7).

Comparative Examples 8, 9 and 15

Each film was produced in the same manner as in Example 1, except that the contents of the modified PVA were changed as shown in Table 1, and various evaluations thereof were carried out. The evaluation results are shown in Table 3.

When the comonomer content is less than 1 mole percent, the film is inferior in water solubility (Comparative Example 8). On the other hand, when the comonomer content is more than 10 mole percent, the biodegradablity of the modified PVA is inferior, and in addition, the strength of the film is small (Comparative Examples 9 and 15).

Comparative Examples 10, 11, 14, 16 and 17

Each film was produced in the same manner as in Example 1, except that the contents of the modified PVA were changed as shown in Table 1, and various evaluations thereof were carried out. The evaluation results are shown in Table 3. When the degree of hydrolysis is less than 75 mole percent, the film has small Young's modulus and strength (Comparative Examples 10 and 14). When the total content of a carboxylic acid and a lactone ring is more than 4.0 mole percent, the biodegradablity of the modified PVA is inferior, and in addition, the strength of the film is small (Comparative Examples 11 and 16). Whereas, when the total content of a carboxylic acid and a lactone ring is smaller than 0.02 mole percent, the film is not only insufficient in solubility, but also inferior in chemical resistance (Comparative Example 17).

Comparative Examples 12 and 13

Each film was produced in the same manner as in Example 1, except that the contents of the modified PVA were changed as shown in Table 1, and various evaluations thereof were carried out. The evaluation results are shown in Table 3.

When the degree of polymerization of the modified PVA is more than 3000, the film is inferior in water solubility (Comparative Example 12). When the degree of polymerization of the modified PVA is less than 300, the film has a small strength (Comparative Example 13).

Comparative Examples 18 and 19

Evaluations were carried out in the same manner as in Example 1, except that the contents of each modified PVA, and the amount of each saccharide were changed as shown in Tables 1 and 2, and a succinic acid fine powder was used as a chemical to evaluate each acid resistance. The evaluation results are shown in Table 3.

As for the film made of an unmodified PVA with a degree of hydrolysis of 88.0 mole percent, the water solubility after packaging of an acidic substance is reduced, and the acid resistance is inferior (Comparative Example 18). The film based on a modified PVA having only a carboxyl group and a lactone ring, and having a degree of hydrolysis of PVA of 98.1 mole percent is inferior in water solubility (Comparative Example 19).

Comparative Examples 20 and 21

Evaluations were carried out in the same manner as in Example 1, except that the contents of each modified PVA, and types and amounts of each additive and inorganic filler were changed as shown in Tables 1 and 2, and a pool bactericide containing trichloroisocyanuric acid as a main component was used as a chemical to evaluate each chlorine resistance. The evaluation results are shown in Table 4.

As for the film made of an unmodified PVA with a degree of hydrolysis of 88.0 mole percent, the water solubility after packaging of a chorine-containing substance is reduced, coloration and hardening of the film occurs, and the chlorine resistance is inferior (Comparative Example 20). The film based on a modified PVA having only a carboxyl group and a lactone ring, and having a degree of hydrolysis of 98.1 mole percent is inferior in water solubility (Comparative Example 21).

TABLE 1

|        | Amount of comonomer (mol %) | Total amount of carboxyl group and lactone ring (mol %) | Amount of vinyl alcohol (mol %) | Amount of residual acetic acid group (mol %) | Degree of polymerization | Degree of hydrolysis (mol %) |
|--------|---|---|---|---|---|---|
| PVA-1  | NVC 4       | 1.0   | 93.5  | 1.5  | 1500 | 98.4 |
| PVA-2  | NVA 2       | 1.5   | 92.5  | 4.0  | 1500 | 95.9 |
| PVA-3  | MNVA 6      | 0.05  | 92.35 | 1.6  | 1000 | 98.3 |
| PVA-4  | NVC 4       | 0.5   | 90.4  | 5.1  | 1200 | 94.8 |
| PVA-5  | NVA 6       | 0.2   | 92.7  | 1.1  | 2000 | 98.8 |
| PVA-6  | NVC 6       | 2.5   | 90.5  | 1.0  | 800  | 98.9 |
| PVA-7  | NVC 3       | 0.5   | 77.1  | 19.4 | 1500 | 80.3 |
| PVA-8  | NVF 4       | 0.5   | 85.2  | 10.3 | 1500 | 89.2 |
| PVA-9  | NVA 3       | 1.0   | 76.8  | 19.2 | 1500 | 80.5 |
| PVA-10 | NVP 2       | 1.0   | 95.9  | 1.1  | 1500 | 98.9 |
| PVA-11 | —           | —     | 88.0  | 12.0 | 1500 | 88.0 |
| PVA-12 | —           | 2.0   | 96.1  | 1.9  | 1500 | 98.1 |
| PVA-13 | —           | 2.0   | 86.4  | 11.6 | 1500 | 88.2 |
| PVA-14 | —           | 5.0   | 93.2  | 1.8  | 1000 | 98.1 |
| PVA-15 | AMPS-Na 3   | —     | 95.3  | 1.7  | 1500 | 98.2 |
| PVA-16 | PAOAE 0.5   | —     | 98.0  | 1.5  | 1000 | 98.5 |
| PVA-17 | PAOAE 1     | —     | 97.3  | 1.7  | 300  | 98.3 |
| PVA-18 | NVC 0.5     | —     | 96.9  | 1.6  | 1500 | 98.4 |
| PVA-19 | NVC 12      | 1.0   | 85.6  | 1.4  | 1500 | 98.4 |
| PVA-20 | NVC 4       | 1.0   | 68.3  | 26.7 | 1500 | 73.1 |
| PVA-21 | NVC 4       | 5.0   | 89.5  | 1.5  | 1500 | 98.4 |
| PVA-22 | NVC 4       | 1.0   | 93.5  | 1.5  | 3300 | 98.4 |
| PVA-23 | NVC 4       | 1.0   | 93.5  | 1.5  | 250  | 98.4 |
| PVA-24 | NVA 2       | 1.5   | 69.0  | 27.5 | 1500 | 72.3 |
| PVA-25 | NVA 12      | 1.5   | 82.4  | 4.1  | 1500 | 95.9 |
| PVA-26 | NVA 2       | 5.0   | 89.1  | 3.9  | 1500 | 95.8 |
| PVA-27 | NVP 2       | 0.015 | 96.89 | 1.1  | 1500 | 98.9 |

NVC: N-vinyl-2-caprolactam
NVA: N-vinylacetamide
MNVA: N-methyl-N-vinylacetamide
NVF: N-vinylformamide
NVP: N-vinyl-2-pyrrolidone
AMPS-Na: Sodium 2-acrylamide-2-mehylpropane sulfonate
PAOAE: Polyoxyethylene monoallyl ether (n = 9)
Total amount of carboxyl group and lactone ring: — denotes not more than the limit of detection (0.01 mol %)

TABLE 2

|                 | PVA    | Alkali metal (wt part(s)) | Plasticizer[1] (wt part(s)) | Additive (wt part(s))[2] | Inorganic filler (wt part(s)) |
|-----------------|--------|------|------------------|--------------------------------|----------|
| Example 1       | PVA-1  | 0.8  | G 15             | ES 10                          | 5        |
| Example 2       | PVA-2  | 1.0  | G 30, PEG 5      | OS 10                          | Silica 10|
| Example 3       | PVA-3  | 0.1  | TMP 20           | RC 7                           | Talc 10  |
| Example 4       | PVA-4  | 1.2  | G 20             | ES 20                          | None     |
| Example 5       | PVA-5  | 0.8  | G 20, PVP 5      | ES 20                          | Silica 5 |
| Example 6       | PVA-6  | 1.3  | TMP 15           | Tre 40                         | None     |
| Example 7       | PVA-7  | 0.8  | G 5              | ES 5                           | None     |
| Example 8       | PVA-8  | 0.8  | DG 20            | None                           | Silica 12|
| Example 9       | PVA-9  | 1.0  | G 5              | ES 5                           | None     |
| Example 10      | PVA-10 | 2.1  | G 10             | RC 10                          | Talc 5   |
| Example 11      | PVA-1  | 0.8  | G 15             | ES 20                          | Talc 5   |
| Example 12      | PVA-5  | 0.8  | G 15             | OS 30                          | Silica 5 |
| Example 13      | PVA-4  | 0.8  | G 15             | PG 1.0, Citric acid 0.8, ES 10 | Talc 5   |
| Example 14      | PVA-6  | 0.8  | G 15             | G 2.0, Tartaric acid 1.0, OS 10| None     |
| Example 15      | PVA-5  | 0.8  | G 15             | PG 1.5, Tartaric acid 1.0, ES 30| Silica 5|
| Example 16      | PVA-4  | 0.8  | G 15             | ES 70                          | Talc 5   |
| Comp. Example 1 | PVA-11 | 0.8  | G 15             | ES 10                          | Talc 5   |
| Comp. Example 2 | PVA-12 | 0.8  | G 15             | ES 10                          | Talc 5   |
| Comp. Example 3 | PVA-13 | 0.8  | G 15             | ES 10                          | Talc 5   |
| Comp. Example 4 | PVA-14 | 1.8  | G 15             | ES 10                          | Talc 5   |
| Comp. Example 5 | PVA-15 | 1.0  | G 15             | ES 10                          | Talc 5   |
| Comp. Example 6 | PVA-16 | 0.8  | G 15             | ES 10                          | Talc 5   |
| Comp. Example 7 | PVA-17 | 0.8  | G 15             | ES 10                          | Talc 5   |
| Comp. Example 8 | PVA-18 | 0.8  | G 15             | ES 10                          | Talc 5   |
| Comp. Example 9 | PVA-19 | 0.8  | G 15             | ES 10                          | Talc 5   |
| Comp. Example 10| PVA-20 | 0.8  | G 15             | ES 10                          | Talc 5   |
| Comp. Example 11| PVA-21 | 0.8  | G 15             | ES 10                          | Talc 5   |
| Comp. Example 12| PVA-22 | 0.8  | G 15             | ES 10                          | Talc 5   |

TABLE 2-continued

|  | PVA | Alkali metal (wt part(s)) | Plasticizer[1] (wt part(s)) | Additive (wt part(s))[2] | Inorganic filler (wt part(s)) |
|---|---|---|---|---|---|
| Comp. Example 13 | PVA-23 | 0.8 | G 15 | ES 10 | Talc 5 |
| Comp. Example 14 | PVA-24 | 1.0 | G 30, PEG 5 | OS 10 | Silica 10 |
| Comp. Example 15 | PVA-25 | 1.0 | G 30, PEG 5 | OS 10 | Silica 10 |
| Comp. Example 16 | PVA-26 | 1.0 | G 30, PEG 5 | OS 10 | Silica 10 |
| Comp. Example 17 | PVA-27 | 2.1 | G 10 | RC 10 | Talc 5 |
| Comp. Example 18 | PVA-11 | 0.8 | G 15 | ES 20 | Talc 5 |
| Comp. Example 19 | PVA-12 | 0.8 | G 15 | ES 20 | Talc 5 |
| Comp. Example 20 | PVA-11 | 0.8 | G 15 | PG 1.0, Citric acid 0.8, ES 10 | Talc 5 |
| Comp. Example 21 | PVA-12 | 0.8 | G 15 | PG 1.0, Citric acid 0.8, ES 10 | Talc 5 |

[1]Plasticizer; G: Glycerin, TMP: trimethylolpropane, DG; diglycerin, PEG; Polyethylene glycol (number-average molecular weight 400), PVP: polyvinyl pyrrolidone (weight-average molecular weight 10000)
[2]Additive; ES: Etherified starch, RC: Raw cornstarch, Tre: Trehalose, OS: Oxidized starch (MS-3800 manufactured by NIHON SHOKUHIN KAKO CO., LTD), G: gallic acid, PG: Propyl gallate

TABLE 3

|  | Water solubility (sec.) | Biodegradability (%) | Young's modulus (kg/mm$^2$) | Strength (kg/cm$^2$) | Water solubility after chemical packaging (sec.) |
|---|---|---|---|---|---|
| Example 1 | 61 | 83 | 3.6 | 3.0 | 62 |
| Example 2 | 73 | 90 | 4.9 | 2.7 | 81 |
| Example 3 | 65 | 80 | 4.2 | 2.1 | 66 |
| Example 4 | 55 | 85 | 3.1 | 2.7 | 58 |
| Example 5 | 64 | 84 | 2.8 | 2.2 | 68 |
| Example 6 | 46 | 74 | 2.2 | 2.1 | 46 |
| Example 7 | 18 | 91 | 1.2 | 1.5 | 26 |
| Example 8 | 66 | 82 | 2.9 | 2.3 | 80 |
| Example 9 | 16 | 92 | 1.0 | 0.9 | 45 |
| Example 10 | 155 | 80 | 3.0 | 2.4 | 233 |
| Example 11 | 76 | 88 | 3.3 | 1.9 | 78 |
| Example 12 | 65 | 78 | 2.8 | 1.9 | 66 |
| Comp. Example 1 | 110 | 80 | 3.2 | 3.1 | Insoluble |
| Comp. Example 2 | >300 | 69 | 4.6 | 3.6 | >300 |
| Comp. Example 3 | 67 | 65 | 2.5 | 1.8 | Insoluble |
| Comp. Example 4 | 39 | 34 | 2.7 | 2.1 | 48 |
| Comp. Example 5 | 28 | 49 | 3.3 | 3.0 | 35 |
| Comp. Example 6 | >300 | 77 | 10.0 | 3.4 | >300 |
| Comp. Example 7 | >300 | 67 | 9.1 | 0.9 | >300 |
| Comp. Example 8 | >300 | 85 | 4.8 | 4.0 | >300 |
| Comp. Example 9 | 23 | 48 | <0.1 | 0.5 | 24 |
| Comp. Example 10 | 14 | 93 | <0.1 | 0.4 | 22 |
| Comp. Example 11 | 24 | 43 | 1.8 | 1.5 | 40 |
| Comp. Example 12 | 270 | 78 | 2.2 | 3.1 | >300 |
| Comp. Example 13 | 45 | 88 | 2.7 | 0.6 | 54 |
| Comp. Example 14 | 17 | 91 | <0.1 | 0.5 | 26 |
| Comp. Example 15 | 25 | 46 | <0.1 | 0.4 | 28 |
| Comp. Example 16 | 29 | 42 | 2.1 | 1.7 | 36 |
| Comp. Example 17 | 245 | 82 | 3.2 | 2.6 | >300 |
| Comp. Example 18 | 113 | 80 | 3.3 | 2.9 | >300 |
| Comp. Example 19 | >300 | 76 | 4.7 | 3.5 | >300 |

TABLE 4

|  | Water solubility (sec.) | Young's modulus (kg/mm$^2$) | Strength (kg/cm$^2$) | Water solubility after chemical packaging (sec.) | Coloration after chemical packaging | Hardness after chemical packaging |
|---|---|---|---|---|---|---|
| Example 13 | 54 | 2.3 | 2.4 | 56 | ◯ | ◯ |
| Example 14 | 50 | 2.2 | 1.8 | 51 | ◯ | ◯ |
| Example 15 | 66 | 1.8 | 1.6 | 68 | ◯ | ◯ |
| Comp. Example 20 | 118 | 3.0 | 3.1 | Insoluble | X | X |
| Comp. Example 21 | >300 | 4.6 | 3.6 | Insoluble | X | X |

As for the water-soluble film of the present invention, not only the solubility in cold water is excellent, but also the solubility in water is not reduced even after packaging of a chemical. The biodegradability, and practical physical properties such as strength and stiffness are simultaneously excellent. Therefore, the film is preferably used particularly for the purpose of packaging agrochemicals, detergents, and the like.

Although the present invention has been fully described in connection with the preferred embodiments thereof, those skilled in the art will readily conceive of numerous changes and modifications within the framework of obviousness upon the reading of the specification herein presented of the present invention. Accordingly, such changes and modifications are, unless they depart from the scope of the present invention as delivered from the claimed annexed thereto, to be construed as included therein.

What is claimed is:

1. A water-soluble film comprising a modified polyvinyl alcohol which comprises an N-vinylamide monomer unit in an amount of 1 to 10 mole percent, and a carboxyl group and a lactone ring in a total amount of 0.020 to 4.0 mole percent in the molecule, and having a degree of polymerization of 300 to 3000, and a degree of hydrolysis of 75 to 99.5 mole percent wherein said N-vinylamide monomer unit is at least one selected from the group consisting of N-vinyl-2-caprolactam and the monomers represented by formula (I):

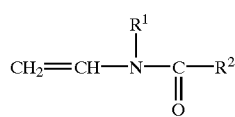

wherein $R^1$ denotes a hydrogen atom or an alkyl group having 1 to 3 carbon atoms, and $R^2$ denotes a hydrogen atom or an alkyl group having 1 to 5 carbon atoms.

2. The water-soluble film according to claim 1, further comprising an alkali metal in an amount of 0.05 to 2 parts by weight in terms of sodium per 100 parts by weight of the modified polyvinyl alcohol.

3. The water-soluble film according to claim 1, wherein the degree of hydrolysis of the modified polyvinyl alcohol is 82 to 99.5 mole percent.

4. The water-soluble film according to claim 3, wherein the degree of hydrolysis of the modified polyvinyl alcohol is 86 to 99.4 mole percent.

5. The water-soluble film according to claim 4, wherein the degree of hydrolysis of the modified polyvinyl alcohol is 90 to 99.2 mole percent.

6. The water-soluble film according to claim 5, wherein the degree of hydrolysis of the modified polyvinyl alcohol is 92 to 99.0 mole percent.

7. The water-soluble film according to claim 1, wherein the degree of polymerization of the modified polyvinyl alcohol is 400 to 2500.

8. The water-soluble film according to claim 7, wherein the degree of polymerization of the modified polyvinyl alcohol is 500 to 2000.

9. The water-soluble film according to claim 1, wherein the N-vinylamide monomer unit is represented by monomers of formula (I).

10. The water-soluble film according to claim 1, wherein the N-vinylaniide monomer is N-vinyl-2-caprolactam.

11. The water-soluble film according to claim 1, further comprising a saccharide in an amount of 1 to 100 parts by weight per 100 parts by weight of the modified polyvinyl alcohol.

12. The water-soluble film according to claim 1, further comprising an inorganic filler in an amount of 0.5 to 20 parts by weight per 100 parts by weight of the modified polyvinyl alcohol.

13. The water-soluble film according to claim 1, further comprising a gallic acid or an alkyl ester thereof having 1 to 5 carbon atoms in an amount of 0.05 to 20 parts by weight, and a hydroxycarboxylic acid or a salt thereof having a reducing property in an amount of 0.01 to 10 parts by weight per 100 parts by weight of the modified polyvinyl alcohol.

14. A package comprising an acidic substance, and the water-soluble film according to claim 1, wherein the acidic substance is packaged in the water-soluble film.

15. A package comprising a chlorine-containing substance, and the water-soluble film according to claim 1, wherein the chlorine-containing substance is packaged in the water-soluble film.

16. A package comprising a chlorine-containing substance, and the water-soluble film according to claim 13, wherein the chlorine-containing substance is packaged in the water-soluble film.

17. The water-soluble film according to claim 1, wherein the N-vinylamide monomer unit is comprised in the modified polyvinyl alcohol in an amount of 3 to 10 mole percent.

* * * * *